Patented Dec. 25, 1928.

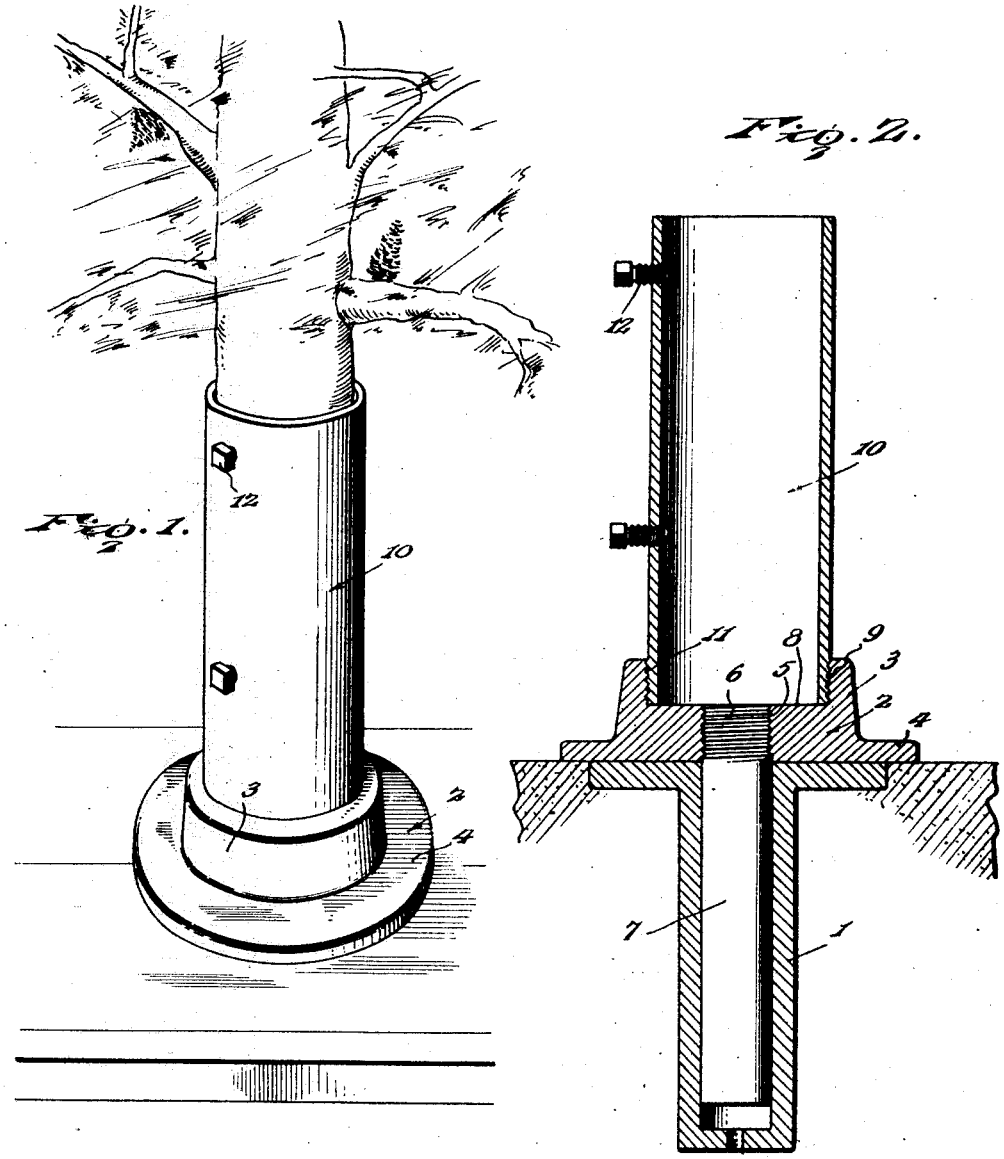

1,696,288

UNITED STATES PATENT OFFICE.

FRANK KARL UNDERWOOD, OF OSKALOOSA, IOWA.

TREE HOLDER.

Application filed May 17, 1926. Serial No. 109,710.

This invention relates to improvements in tree holders and more particularly to that type which are designed to support a cut tree in an upright position. It has been the custom in many communities to set up Christmas trees along the sidewalks for decorative purposes during the Christmas holidays and at other times, and this has usually been accomplished by setting up a tile of suitable size to accommodate the trunk of the tree to be supported and either disposing the tile in an opening in the sidewalk or packing a mass of sand about the same. However, this has been found to be unsatisfactory for the reason that in inclement weather moisture will accumulate and freeze, thereby rendering it extremely difficult to remove the trees at the time it is desired to do so. Therefore, it is one of the objects of the present invention to provide a tree holder which may be readily set up and which, when properly arranged, will be adapted to accommodate the trunk of the tree to be held and will firmly hold the tree and maintain the same in an upright position, and the invention likewise has as its object, in this connection, to so construct the holder that no difficulty will be experienced in removing the holder from its position upon the pavement nor in separating the tree and the holder, so that the difficulties heretofore experienced and referred to above are overcome.

In the accompanying drawings:

Figure 1 is a perspective view of the holder embodying the invention installed and supporting a tree.

Figure 2 is a vertical diametric sectional view through the holder, positioned for use.

In the drawings, the numeral 1 indicates a cylindrical socket of any suitable metal, such for example as cast iron, which is embedded in the material of the sidewalk and has its open upper end flush with the surface of the sidewalk, and this member is permanently installed, whether for the purposes of the present invention, solely, or for other purposes. The holder comprises a base 2 which may be of cast iron and which comprises a preferably cylindrical or conical body portion 3 possessing sufficient mass to render the base very substantial, and an outstanding peripheral flange 4, the under side of which is flat and flush with the under side of the body 3. The body of the base is formed centrally with a threaded opening 5, and fitted into this opening is the upper threaded end 6 of a cylindrical and substantial stem 7 which is of a diameter to relatively snugly fit within the bore of the socket member 1, and of such length as to extend nearly to the bottom of the socket member when fitted into the bore thereof, the base at such time resting at its under side flat upon the surface of the sidewalk, as clearly shown in Figure 2 of the drawings. The stem 7 may be solid or hollow, either as preferred, but it is contemplated that both it and the base with which it is assembled will be sufficiently substantial to preclude any overturning of the tree which is supported by the device.

The body 3 is formed in its upper side with a cylindrical socket 8 concentric to the opening 5 and having its wall threaded as indicated by the numeral 9.

The numeral 10 indicates the socket member into which the trunk of the tree is to be fitted and this socket member comprises a cylindrical metal body open at its upper and lower ends and exteriorly threaded at its lower end as at 11, to fit the threads 9 of the socket formed in the body of the base 2, the socket member 10 being preferably threaded into the base until its lower end contacts the bottom wall of the socket or recess 8 in the said base. In view of the substantial nature of the structure, the socket member 10 may be relatively short, it having been found in practice that if the member is approximately a foot in height, it will be capable of supporting a tree fifteen feet or more in height. In the use of the holder, the trunk of the tree is inserted into the socket member 10 with its butt end resting upon the bottom of the recess 8 of the base member 2, and in order that the tree may be firmly held within the socket member, against movement with respect thereto, clamping screws 12 are threaded through the wall of the socket member 10 and are tightened to bind against the tree trunk. These screws will preferably be arranged at one side of the socket member so that the tree trunk will be firmly held against the wall of the socket member at the side opposite the screws, the screws being preferably located in vertical alinement, as illustrated in the drawings, and being located one near the top of the socket member and the other near the lower end thereof.

From the foregoing description of the invention, it will be evident that a tree having its trunk disposed and secured within the socket member 10, will be firmly held in an upright position and, due to the substantial construction of the device as a whole and the secure manner in which it is held against displacement, there will be no likelihood of the tree being blown over by the wind. It will, furthermore, be evident that after trees employed for decorative purposes along sidewalks have served their purpose, and it becomes necessary to remove them, this may be accomplished without any difficulty and without waste of time, it being only necessary to bodily lift the tree and the holder, thus disengaging the stem 7 from the socket 1, after which the holder may be separate from the tree by loosening the clamping screws 12, such separation of the holders from the trees being accomplished, for example after the trees have been hauled away to the place where they will be disposed of. It will likewise be evident that, in setting up the holders and trees, but little time and labor will be consumed, inasmuch as it is only necessary to fit the stems 7 into the sockets 1 and step the trunks of the trees into the socket members 10, or, if the holders have previously been adapted to the trunks of the trees, it is only necessary to fit the stems 7 of the holders into the sockets and then, if necessary, rotate the holders until the trees have been positioned in the most attractive manner with regard to the spread of their branches.

It will be evident from the foregoing description of the invention that the socket 1 may be embedded in the sidewalk solely for the purposes of the present invention, namely to accommodate the stem 7 so as to securely support the holder of which the standard constitutes a part and prevent any object which is supported within the socket member of the holder in an upright position from overturning through topheaviness or the force of winds, or this socket 1 may be one which has been already installed for the reception of the staffs of flags, signs, advertisements, or the like.

Having thus described the invention, what I claim is:

1. In a tree holder of the class described, the combination with a socket to be permanently anchored in situ and having its bottom formed with an outlet, of a base comprising a body having a recess in its upper face, the base having a flat under face to engage the surface of the material in which the socket is embedded and rest upon the upper end of the socket, a hollow stem carried by and projecting downwardly from the base and removably fitted into the socket, the upper end of said stem communicating with said recess whereby the stem constitutes a drain for the recess, and a tubular tree trunk-receiving socket member disposed vertically and having its lower end fitted into the said recess.

2. A device of the class described comprising a base having an upwardly extending annular flange forming a recess and internally threaded to receive a socket, said base having a threaded opening leading from its under face and communicating with the recess, a tubular stem having a threaded upper end screwed into the said opening, and a socket member having its lower end screwed in the said recess and upstanding from the base, said base having a portion of greater diameter than the socket and projecting radially from the socket and stem.

In testimony whereof I affix my signature.

FRANK KARL UNDERWOOD. [L. S.]